United States Patent [15] 3,666,973
Hulsman, Jr. [45] May 30, 1972

[54] SOLID STATE ELECTRONIC THERMOSTAT

[72] Inventor: William H. Hulsman, Jr., Needham, Mass.
[73] Assignee: Control Design, Inc., Needham, Mass.

[22] Filed: Aug. 19, 1970
[21] Appl. No.: 65,130

[52] U.S. Cl. ..............................307/310, 219/499, 219/501, 236/15, 307/252 N
[51] Int. Cl. ..............................H03k 17/00
[58] Field of Search ..............................307/310, 252, 70; 219/499, 219/501; 236/15; 317/153; 323/75

[56] References Cited

UNITED STATES PATENTS

| | | | |
|---|---|---|---|
| 3,553,429 | 1/1971 | Nelson | 219/499 |
| 3,449,599 | 6/1969 | Henry | 219/499 |
| 3,414,741 | 12/1968 | Reinert | 307/310 |
| 3,427,436 | 2/1969 | Finnegan | 219/499 |
| 3,136,877 | 6/1964 | Heller | 219/499 |

*Primary Examiner*—Donald D. Forrer
*Assistant Examiner*—David M. Carter
*Attorney*—Russell & Nields

[57] ABSTRACT

An apparatus for controlling the temperature of a device such as an oven in which a resistance having a positive temperature coefficient of resistance is incorporated in one leg of a bridge and is used to detect the temperature to be controlled. The bridge is energized by an alternating voltage and any unbalance appears across output terminals which are connected respectively to the bases of a first and a second transistor also energized with the same alternating voltage. The emitters of the transistors are connected together and through a common resistance so that the initiation of current flow through one transistor will inhibit current flow through the other. Flow of current through the second transistor triggers a silicon control rectifier which in turn controls a valve which supplies fuel to a burner in the oven. The voltage supplied to the bridge leads the voltage on the control rectifier so that it is always triggered at the beginning of its conducting half cycle. A third transistor is interposed between the second transistor and the silicon control rectifier. The changes in the response of the third transistor to its ambient temperature is compensated for in one of a number of ways. One is to have an ambient temperature sensitive resistance in the leg of the bridge diagonally opposite the first leg in which the first temperature sensitive resistance is placed. A second arrangement is to insert an ambient temperature sensitive diode in a leg adjacent to the first leg. A third arrangement is to insert an ambient temperature sensitive diode across the base and emitter of the third transistor. A delay circuit is provided for charging a condensor to delay the operation of the second transistor, the charge of said condensor being permitted to build up upon the initiation of current through the first transistor.

2 Claims, 3 Drawing Figures

Patented May 30, 1972 3,666,973

INVENTOR
WILLIAM H. HULSMAN, JR.

BY Russell and Nields

ATTORNEYS

SOLID STATE ELECTRONIC THERMOSTAT

BACKGROUND OF THE INVENTION

1. Field of the Invention

Solid state electronic apparatus for controlling temperature.

2. Description of the Prior Art

The problem of controlling the temperature of such devices as ovens by means of a solid state electronic control apparatus in a reliable and fail-safe manner has existed for a substantial period of time. The prior art has produced a number of systems which suffer from the drawbacks of being unduly complex and expensive; or incapable of sufficiently close temperature regulation without the use of unnecessarily complex equipment; or which generated excessive amounts of spurious radiations; or which were highly susceptible to changes in ambient temperatures of the control elements. These and other defects have created a demand for a simple reliable, and fail-safe system in which the above defects have been eliminated.

SUMMARY OF THE INVENTION

In the present invention the limitations of the prior art have been overcome through the use of a bridge in one leg of which is inserted an element which varies its resistance in response to the temperature to be controlled. The bridge is energized with an alternating voltage and any unbalance in the bridge appears across diagonally opposite terminals which are connected respectively to the bases of a first and second transistor which are also energized by the same alternating voltage. Which transistor first conducts and predominates during each conductive half cycle depends upon which base has the higher positive voltage applied to it by the output of the bridge during such conductive half cycle. The transistors are also connected in parallel and in series with a common resistance so that when conduction of current is initiated through one of them, conduction through the other will be inhibited. When the temperature is below the desired value, the bridge is unbalanced to cause the second transistor to conduct and to inhibit current flow in the first transistor. Current flowing through the second transistor is caused to trigger a control rectifier to complete a circuit through a temperature control element such as a gas valve supplying gas to a burner. When the temperature is high enough, the bridge is unbalanced in the opposite sense and the first transistor conducts more heavily, inhibiting current flow in the second transistor which causes the control rectifier to stop conducting thus shutting off current to the gas valve operator. The phase of the voltage on the control rectifier lags the voltage on the bridge so that the control rectifier is always triggered early in its conducting half cycle. A third transistor is used as an amplifier between the second transistor and the control rectifier. Transistors are sensitive to their ambient temperatures. The system is stabilized against variations, which tend to be produced by the ambient temperature of the third transistor, by the use of an ambient temperature sensitive resistance in the leg of the bridge opposite the leg in which the first temperature sensitive element is located, or by an ambient temperature sensitive diode in the leg of the bridge adjacent to the last named leg, or by such a diode connected across the input to the third transistor.

DETAILED DESCRIPTION OF THE INVENTION

Figure 1:
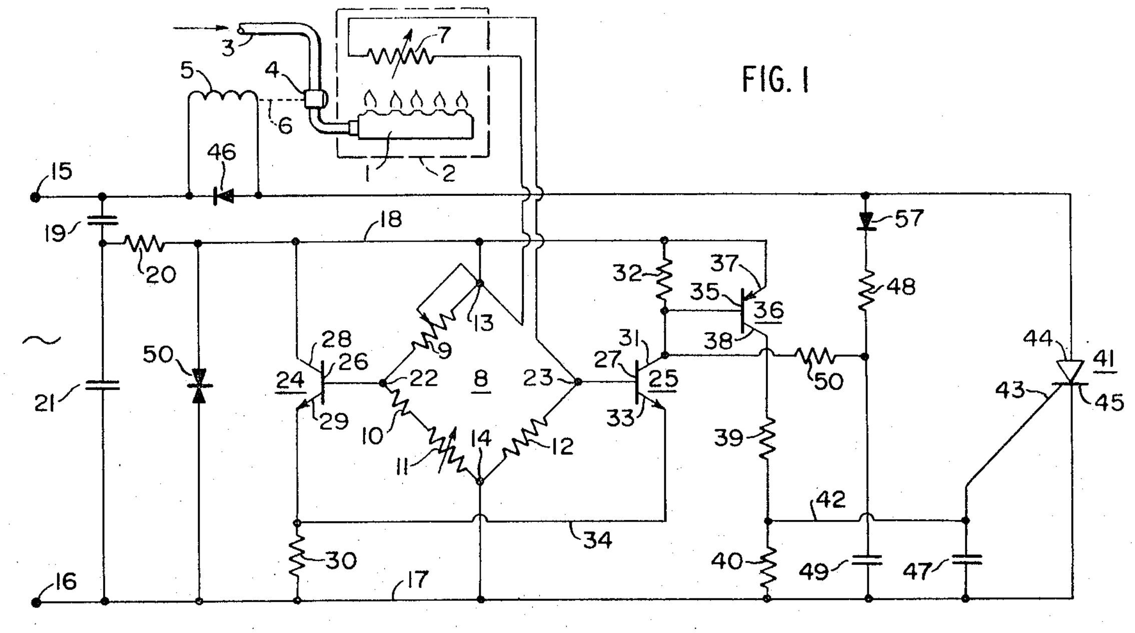

In the embodiment shown in FIG. 1, a burner 1 is adapted to heat an enclosure, such as an oven, designated diagrammatically by the dotted box 2. The burner 1 is supplied with fuel, such as a combustible gas, from a supply line 3 through a valve 4 which is opened and closed by a solenoid 5 connected to the valve through a suitable operator 6. When solenoid 5 is energized, valve 4 is opened to admit fuel to burner 1 and when solenoid 5 is de-energized, valve 4 is closed to shut off the flow of fuel.

The temperature with the oven 2, which is to be controlled to a selected value, is sensed by a temperature sensitive member such as a resistance 7 having a positive temperature coefficient of resistance. Resistances of this type are well known and readily available. Resistance 7 forms one leg of a bridge 8, the other legs of which consist of resistances 9, 10, 11 and 12. The nature and function of these resistances will be described below. The bridge 8 is energized by an alternating voltage applied between terminals 13 and 14. Terminal 13 is located at the junction of resistances 7 and 9, and terminal 14 is located at the junction of resistances 11 and 12. The alternating voltage is derived from a pair of terminals 15 and 16 which are adapted to be fed from an alternating current power line. Terminal 16 is connected to a lead 17 which may be considered the ground lead. Bridge terminal 14 is connected to lead 17. Terminal 15 is connected to a lead 18 through a condenser 19 (e.g. 2uf) and a resistance 20 (e.g. 68 Ω). A condensor 21 (e.g. 0.05uf) is connected in series with condensor 19 to lead 17. Bridge terminal 13 is connected to lead 18. Under this arrangement bridge 18 is energized by an alternating voltage which leads the line alternating voltage appearing at terminals 15 and 16.

The output terminals of bridge 8 are 22 and 23 located respectively at the junction between resistances 9 and 10 and the junction between resistances 7 and 12. Any unbalance of bridge 8 will appear as an alternating voltage at these output terminals. The point at which the bridge is in balance may be selected by making resistance 9 adjustable (e.g. 100Ω max.) and setting the value of that resistance at a predetermined level. Resistance 12 may be a fixed resistance (e.g. 68Ω) and resistance 10 may be a fixed resistance (e.g. 47Ω) and resistance 11 may be a temperature sensitive resistance having a positive temperature coefficient of resistance (e.g. 18Ω) (when cold) and of a material similar to that of resistance 7. The function of resistance 11 is to compensate for ambient temperature conditions as will be explained more fully below.

A pair of solid state electronic control devices, such as transistors 24 and 25 (e.g. 2N3904), have their control elements, or bases, 26 and 27 connected respectively to the bridge output terminals 22 and 23. The collector 28 of transistor 24 is connected directly to lead 18 and its emitter 29 is connected through a relatively high resistance 30 e.g. 10KΩ) to lead 17. The collector 31 of transistor 25 is connected through an output resistance 32 (e.g. 3.3KΩ) to lead 18 and the emitter 33 of transistor 25 is connected by lead 34 directly to the emitter 29 of transistor 24. During each conducting, or positive half cycle of the alternating voltage appearing across leads 17 and 18, one of the transistors 24 or 25 will conduct more heavily than the other depending upon which base becomes more positive than the other. As the current from the more heavily conducting transistor flows through resistance 30, the voltage drop through that resistance will reduce the voltage across the emitter and base of the other transistor and thus further reduce the tendency of the other transistor to conduct. Only the current through transistor 25 flows through output resistance 32 so that if transistor 24 conducts more heavily than transistor 25 due to the greater positive voltage in base 26, the current flow through transistor 25 will be insufficient to produce a substantial output voltage across resistance 32.

Should the current through transistor 25 predominate because of a greater positive voltage on base 27, such current will produce a substantial output voltage across the output resistance 32. That output voltage is impressed upon the base 35 of a transistor 36 (e.g. 2N3906)by a lead extending from the junction of collector 31 and resistance 32 to the base 35. The emitter 37 of transistor 36 is connected to lead 18 and the collector 38 of transistor 36 is connected through resistance 39 (e.g. 200Ω) and resistance 40 (e.g. 1KΩ) to lead 17. The appearance of a voltage across resistance 32, due to the predominant conduction of transistor 25 during a positive half cycle of the voltage on lead 18, will also cause transistor 36 to conduct and generate an amplified output voltage across resistance 40. The output voltage in turn is used to trigger the firing of a silicon control rectifier 41 (e.g. C106B) by means of a lead 42 connected from the junction of resistance 39 and 40 to the control element 44 of control rectifier 41 the anode 44 of control rectifier 41 is connected to the line terminal 15 in series with the solenoid 5 and the cathode 45 of control rectifier 41 is connected directly to lead 17. Therefore, as long as control rectifier 41 continues to fire during each positive half cycle appearing at terminal 15, solenoid 5 will be energized to keep valve 4 open to supply fuel to burner 1. A diode 46 (e.g. 1N5060)is connected across solenoid 5 to maintain the flow of current through the solenoid between successive pulses of current supplied by the firing of the control rectifier 41. An appropriate condenser 57 (e.g. 0.47uf) is connected from the control element to lead 17.

If the firing of control rectifier 41 were delayed substantially during each positive half cycle applied to it, this would result in a sharp rise in the current flowing through that rectifier and in the voltage across the solenoid 5. Such sharp rises would contain high frequency components which would cause pulses of highly undersirable high frequency disturbances which would be repeated at the line frequency. However, it should be noted that the voltage on lead 18 leads the voltage at terminal 15 due to the condenser 19 and therefore each firing impulse which is delivered at lead 42 occurs at the beginning of the positive half cycle appearing at anode 44. This eliminates such high frequency disturbances.

In the system as discussed above, the values of the resistances in the bridge 8 are selected such that when the oven 2 is below the desired temperature, resistance 7 will be at a value at which the bridge is unbalanced to cause transistor 25 to conduct more heavily than transistor 24. As a result, in the manner so described above, silicon control rectifier 41 will fire to energize solenoid 5 to open valve 4 and supply fuel to the burner 1. When the temperature in oven 2 rises to the desired value, resistance 7 will heat to raise its value to a point at which the bridge 8 goes into balance and beyond to a point at which voltage on base 26 causes transistor 24 to conduct more heavily than transistor 25. As a result, silicon control rectifier 41 stops conducting, thus de-energizing solenoid 5 and cutting off the flow of fuel to burner 1.

Once transistor 24 assumes control, it is highly desirable that it continue to control the operation until resistance 7 has cooled a sufficient amount to justify again supplying fuel to the burner. This is accomplished by a delay or differential circuit consisting of a diode rectifier 47 (e.g. 1N 5060) connected in series with a high resistance 48 (e.g. 1megohn) and a condenser 49(e.g. 0.01uf) across silicon control rectifier 44. The junction between resistance 48 and condenser 49 is connected through a high resistance 50 (e.g. 1 megohn) to the collector 31 of transistor 25. Once transistor 24 assumes control, a small charging current flows from terminal 15 through solenoid 5, diode 47, resistance 48 and condenser 49 to charge the upper end of condenser 49 positively. The magnitude of this charging current is so small as to have no effect on the energization of solenoid 5. However, the charge on condenser 49 biases the collector 31 of transistor 25 to make it more positive, thus causing the conduction through transistor 24 to predominate until a substantial unbalance of the bridge 8 occur in the cool direction to override the bias covered by the charge on condenser 49 and to cause transistor 25 to conduct more heavily than transistor 24 and thus resume the firing of control rectifier 41 and the supply of fuel to the burner 1. Once control rectifier 41 resumes firing, the voltage for the circuit charging condenser 49 is removed and the charge in condenser 49 is dissipated by discharge through resistance 50 and transistor 25.

The system as described above is preferably arranged with all of the elements, except those shown in FIG. 1 above the level of terminal 15, potted in a compact package. In actual use such a package tends to be subject to substantial temperature variations. If resistor 11 were of the type which has a fixed value, it has been observed that as the temperature of the package rises, the value of the temperature to which the oven is regulated also rises. In order to compensate for such variations, resistance 11, as previously indicated, is of the type which has a positive temperature coefficient. It will be noted that a rise in resistance 11 operates to change the balance of bridge 8 in the same direction to that which is caused by an increase in resistance 7. Thus, resistance 11 compensates for variations introduced by temperature changes in the package.

It is possible for sufficiently high voltage pulses to occur which would damage the transistors energized between leads 18 and 17, particularly when voltage is first applied at terminals 15 and 16. To protect these transistors a trigger device 50 of any well known type,such as a semiconductor which remains non-conductive until the voltage across it rises to a predetermined breakdown value (e.g. 32 voltage) at which point it becomes strongly conductive. Thus any surge of voltage sufficient to damage the transistors will be short circuited by the trigger device 50.

It is believed that the variation in the regulation of the system, due to variations in the temperature of the package described above is due primarily to the variation in the sensitivity of transistor 36 with temperature. In any semiconductor device incorporating a junction, the junction has a forward barrier voltage; that is, the voltage which must be exceeded before the junction begins to conduct in its conducting direction. For example, a semiconductive diode junction may have a forward barrier voltage at normal room temperature of about 0.6 or 0.7 volts. As its temperature rises its forward barrier voltage drops. Therefore as the temperature of transistor 36 rises it tends to conduct more readily with lower voltages impressed on its base 35 by resistance 32. Thus a current flow through transistor 25 which at normal room temperature would be insufficient to produce enough conduction through transistor 36 to fire control rectifier 31, might be enough to produce such conduction at higher temperatures of transistor 36. The result would be to continue the firing of control rectifier 41 beyond the desired temperature of oven 2. In FIG. 1, resistance 11 compensates for such variations. However other compensating means could be used.

Figure 2:
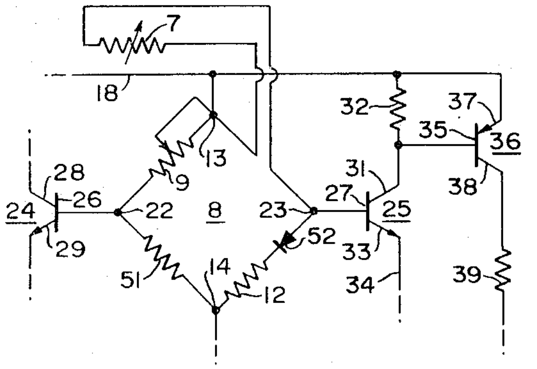

FIG. 2, illustrates another arrangement for compensating for temperature variations of the control system including transistor 36. In FIG. 2, which is a partial view of a variation of the system shown in FIG. 1, the same reference numbers are used where the elements are the same as in FIG. 1. In FIG. 2, the resistances 10 and 11 of FIG. 1 are replaced by a fixed resistance 51 (e.g. 68Ω). A semiconductor diode 52 is inserted in series with the resistance 12. In this arrangement the diode 52 is also subjected to the temperature at the transistor 36 so that its forward barrier voltage drops with temperature as does the forward barrier voltage of transistor 36. The result is, that as the temperature of the control system rises, diode 51 starts to conduct slightly earlier in the conducting half cycle and, in effect, causes the resistance of the bridge leg, including the resistance 12, to appear to drop. This effects the balance of the bridge in the same direction to that caused by a rise in the value of resistance 7 and this compensates for the variations introduced by temperature changes in the control system.

Figure 3:
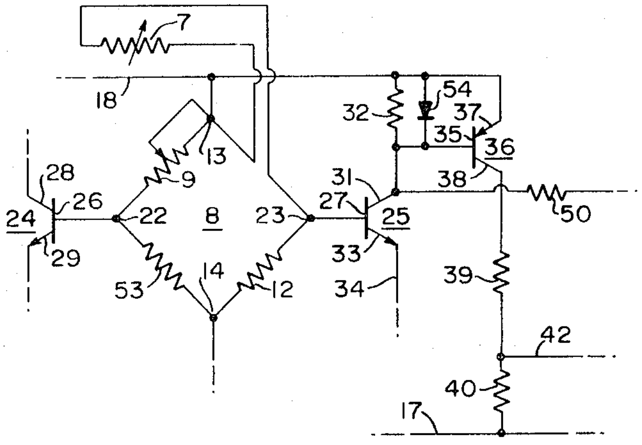

FIG. 3 illustrates another embodiment for compensating for temperature variations of the transistor 36. In FIG. 3, also a partial view of variation of the system shown in FIG. 1, the same reference numbers are used where the elements are the same as in FIG. 1. In FIG. 3 the resistances 10 and 11 of FIG. 1 are replaced by a fixed resistance 53 (e.g. 68Ω). The compensation of transistor 36 is accomplished by connecting a diode 54 directly across output resistance 32 and polarized to conduct during the positive half cycle of lead 18. As the temperature of 36 rises and it tends to conduct on lower values of voltage appearing across resistance 32, the temperature of diode 54 rises, its forward barrier voltage drops, and it tends to conduct earlier in the positive voltage half cycle in lead 18. This, in effect, tends to reduce the voltage appearing across resistance 32, thus reducing the voltage across it by the conduction of transistor 25. The result is that the relationship between the variation in temperatures of resistance 7 and the conduction through transistor 36 remains substantially constant with variations in the ambient temperature of transistor 36.

What is claimed is:

1. In a temperature responsive control apparatus which includes a bridge having two diagonally opposed input terminals, two diagonally opposed output terminals and first means responsive to the temperature to be controlled in one leg of said bridge:

a. second means for supplying alternating power to said input terminals;

b. first and second solid state electronic control devices each having a control element, said control elements being connected respectively to said output terminals;

c. third means for supplying alternating power, of substantially the same phase as that supplied to said input terminals, to said control devices;

d. fourth means common to said control devices for inhibiting the flow of current through said second control device in response to initiation of current flow through said first control device and for inhibiting the flow of current through said first control device responsive to initiation of current flow through said second control device;

e. a controlled rectifier;

f. means for supplying alternating power to said controlled rectifier, said alternating power lagging in phase with respect to the alternating power supplied to said input terminals;

g. means responsive to flow of current through said second control device for initiating current flow through said rectifier;

h. and means responsive to said last named current flow for controlling said temperature;

whereby said phase relationship between the alternating power supplied to said controlled rectifier and the alternating power supplied to said bridge causes initiation of current flow through said controlled rectifier to occur early in the conducting half cycle of alternating power supplied to said controlled rectifier.

2. In a temperature responsive control apparatus which includes a bridge having two diagonally opposed input terminals, two diagonally opposed output terminals and first means responsive to the temperature to be controlled in one leg of said bridge:

a. second means for supplying alternating power to said input terminals;

b. first and second solid state electronic control devices each having a control element, said control elements being connected respectively to said output terminals;

c. third means for supplying alternating power, of substantially the same phase as that supplied to said input terminals, to said control devices;

d. fourth means common to said control device for inhibiting the flow of current through said second control device in response to initiation of current flowing through said first control device and for inhibiting the flow of current through said first control device responsive to initiation of current flow through said second control device;

e. a control circuit including a voltage responsive element to initiate flow of current to control said temperature in response to a predetermined voltage;

f. a condenser;

g. means for charging said condenser in response to current flow through said first control device; and h. means for connecting said condenser to said voltage responsive element in a direction to delay the application of said predetermined voltage to said voltage responsive element.

* * * * *